March 17, 1959  H. J. BEHM ET AL  2,878,396
DIRECTION FINDER FOR AUTOMOBILE HEADLIGHTING SYSTEM
Filed Feb. 27, 1956  4 Sheets-Sheet 1

INVENTORS.
HAROLD J. BEHM.
WILLIAM HECOX.
BY
Charles M. Hogan
ATTORNEY.

INVENTORS.
HAROLD J. BEHM.
WILLIAM HECOX.
BY
Charles M. Hogan
ATTORNEY.

March 17, 1959     H. J. BEHM ET AL     2,878,396
DIRECTION FINDER FOR AUTOMOBILE HEADLIGHTING SYSTEM
Filed Feb. 27, 1956     4 Sheets-Sheet 3

INVENTORS.
HAROLD J. BEHM.
WILLIAM HECOX.
BY *Charles M. Hogan*
ATTORNEY.

March 17, 1959 H. J. BEHM ET AL 2,878,396
DIRECTION FINDER FOR AUTOMOBILE HEADLIGHTING SYSTEM
Filed Feb. 27, 1956 4 Sheets-Sheet 4

INVENTORS.
HAROLD J. BEHM.
WILLIAM HECOX.
BY
Charles M. Hogan
ATTORNEY.

United States Patent Office 2,878,396
Patented Mar. 17, 1959

2,878,396

DIRECTION FINDER FOR AUTOMOBILE HEADLIGHTING SYSTEM

Harold J. Behm, Canal Winchester, and William Hecox, Groveport, Ohio, assignors, by mesne assignments, to J. Page Hayden Application February 27, 1956, Serial No. 567,970

4 Claims. (Cl. 250—233)

The present invention relates to devices for detecting the presence of a light source and indicating the relative bearing thereof, and more specifically to a novel direction finder which continuously measures the horizontal angle between an equipped car and the inner head lamp of the approaching car (i. e., the head lamp on the right as seen from the equipped car). The expression "equipped car" designates an automobile which is equipped with a headlighting system generally in accordance with United States Patent No. 2,562,258, issued to Evan P. Bone, on July 31, 1951, or improvements thereof shown in the pending United States patent application of Evan P. Bone, Serial No. 354,696, filed May 13, 1953, and assigned to the assignee of the present application and invention, now U. S. Patent 2,753,487, issued July 3, 1956.

While the present invention is of general utility, it is particularly advantageous in determining the presence and bearing of a head light of an approaching vehicle.

In the Bone headlighting system, as disclosed in the aforementioned patent application, a direction finder detects the presence and bearing of a head lamp of an oncoming vehicle and positions a vane in azimuth in such a way as continuously to indicate the relative bearing of such vehicle. The vane transmits its own angular position to similar vanes in the head lamps which are governed by the angular-position signal indications of the direction finder vane in such a way as continuously to project a non-glare shadow in the zone of the approaching vehicle.

A primary object of the invention is to provide an improved light source detector for the direction finder in such an automobile head lamp system, advantageous in the respect that it responds primarily to the presence of a source of light of predetermined diameter and is relatively independent of background illumination. A light detector in accordance with the present invention discriminates against and prevents spurious responses which would otherwise be caused by illuminated signs, by the reflection from the road of light from the head lamps of the equipped car, and by large illuminated areas which would interfere with the proper operation of the system in the absence of a detector selectively responsive to an automobile head lamp.

Another object of the invention is to provide a direction finder of high accuracy and speed of response.

In accordance with the invention there is provided a light-sensitive signaling means and means interposed between said signaling means and a field of light for admitting to said signaling means light from a relatively constant portion of said field while periodically blocking out any light source of predetermined diameter which may be present in the field. In the particular embodiment herein shown the light-sensitive signal generator is a phototube, concentrically disposed within a rotating hollow cylinder which constitutes the means for admitting to the phototube a relatively constant portion of the field of vision. The open or transparent portions or bands of the cylinder perform the admitting function, while the dark or opaque portions or bands thereof constitute the means for periodically blocking out a light source of predetermined diameter, such as an automobile head lamp. The phototube generates fluctuating signals indicative of the presence of the lamp in the field of vision and these signals are selectively amplified and utilized to actuate means which continuously indicates the relative bearing of the lamp.

Further, in accordance with the invention, we provide a direction finder comprising the combination of our detecting means and means for angularly positioning the vane in accordance with the bearing of such light source, thus indicating the bearing of the oncoming head lamp relative to the equipped car. A galvanometer movement for positioning the vane, a suitable vane per se, and a combination of galvanometer and vane are shown in the Bone patent application referred to above and need not be described in detail herein.

For a better understanding of the present invention, together with other and further objects, advantages and capabilities thereof, reference is made to the following description of the appended drawings, in which.

As taught by Bone, an essential element of a head lamp system of the type with which the invention is primarily concerned is the direction finder, which continuously measures the horizontal angle between the equipped car and the left or inner head lamp of the approaching car (i. e., head lamp on the right as seen from the equipped car). This angle is referred to as "relative bearing." The ultimate function of the direction finder is to position in azimuth a vane which, by transmitting its angular position (by means which need not be described herein, because shown in the Bone patent application mentioned above), governs the instantaneous angular positions of shadow-casting vanes in the head lamps.

Figure 1:
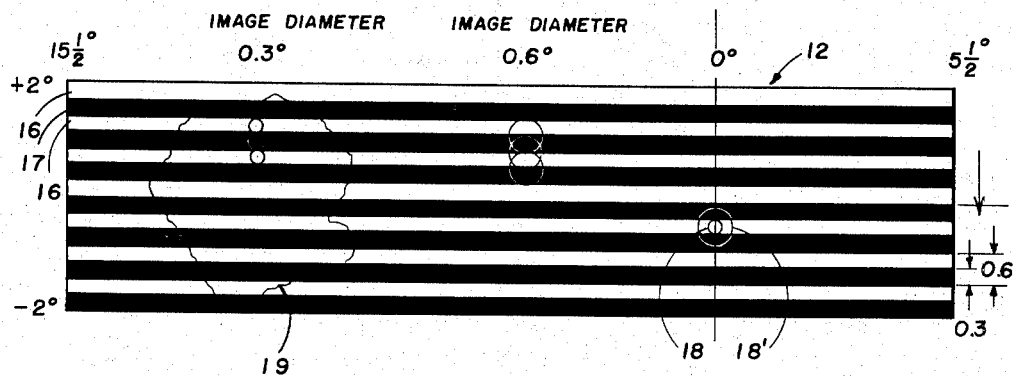
Fig. 1 is an explanatory diagram, with illustrative dimensions, showing the principles we have discovered and which our light detector exploits.
Figure 6:
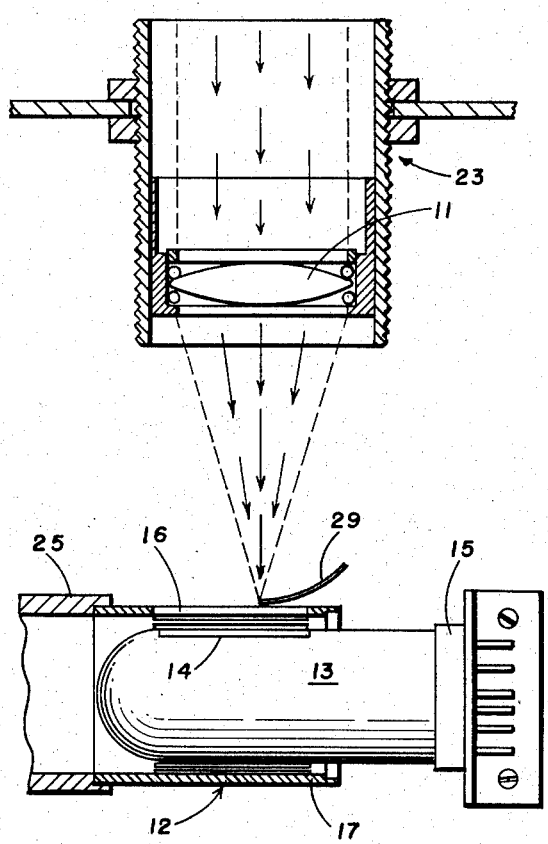
Fig. 6 is a cross-sectional view taken on a plane passing centrally through the discriminator-cylinder and the optical system, showing the relationship therebetween.
Figure 7:
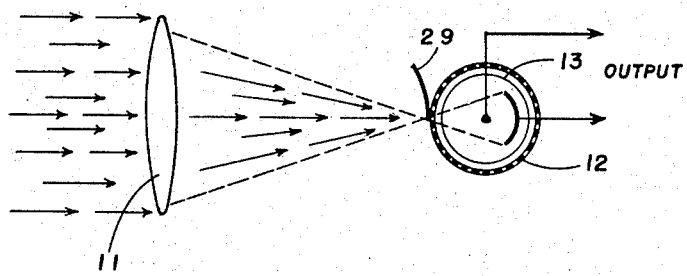
Fig. 7 is a schematic generally indicating the concentration of light at the vane per se, as taught in Bone Patent No. 2,562,258, specifically in Fig. 3 thereof.

Referring now to Figs. 6 and 7, for an explanation of the principles of the present invention, light from a selected area in front of the equipped vehicle passes through a lens 11, and is concentrated in the region of the direction-finder vane as taught by Bone. The light passes through the open slits or transparent bands in a discriminator-cylinder 12 to a phototube 13, the bulb of which is entirely masked, with the exception of a rectangular transparent light-admitting portion 14, which, together with the lens, defines the image of a field of vision. The phototube 13 is mounted on a conventional socket. The discriminator-cylinder 12 is mounted concentric with and for axial rotation about the phototube 13, and is formed with a multiplicity of axially extending slits or light-admitting bands 16 each alternating with an integral strip 17. Each slit 16 provides an open or transparent band 16 as illustrated in Fig. 1, and each intervening integral strip or band 17 corresponds to an opaque or light-intercepting dark strip 17 as illustrated in Fig. 1. These slits and strips will hereinafter be referred to as clear and dark bands. These bands on the cylinder control the instantaneous passage of light from lens 11 to phototube 13 in such a way as, in association with the phototube circuit, to discriminate between a point source of light, such as the headlamp of an oncoming vehicle, and illuminated areas of appreciable size, such as signs or the road reflections of own lamps, for example.

In operation light from a large portion of the field passes through the slits of rotating cylinder 12 to phototube 13. When there is no light in the field, only a small direct current flows in the phototube. When a larger illuminated area is in the field, a somewhat larger current flows in the phototube, but this is primarily a direct current and the amplifier unit of the light-sensitive signal generator is capacitively coupled to the phototube so as to eliminate the direct-current component. When a point light source, as from a head lamp, appears in the field, there is superimposed on the steady current component a fluctuating or alternating current component which is selectively amplified to cause the vane to be angularly positioned continuously to indicate the bearing of such source.

The horizontal dark bands 17 on the discriminator-cylinder 12 effectively sweep past the image of a light source, blocking it out at a rate of 750 cycles per second, for example. This rate has been found to be satisfactory but is not intended to be a limitation. We prefer to utilize a cylinder having approximately 150 opaque bands, so that several transparent bands are in the field at any instant.

In our investigations at the Battelle Memorial Institute we constructed a practical working model of the present invention for experimental demonstrations, and so designed the optical system and the cylinder 12 that light from the head lamp of an approaching car at a distance of one hundred feet, represented by the reference numeral 18 in Fig. 1, would be completely blocked or intercepted by a strip extending over 0.3 degree of the circumference of cylinder 12. When the same head lamp is fifty feet from the equipped car, its image is doubled in size as indicated by the reference numeral 18'.

Let us consider an illuminated area 19 as illustrated in Fig. 1, covering several opaque and transparent bands. Since the total amount of light reaching the phototube is a function of that admitted by a plurality of transparent bands, background light areas such as 19 will produce no substantial alternating current component in the phototube response. However, when the head lamp of an aproaching automobile enters the field the light from the lamp will be blocked out when an opaque band is interposed between it and the phototube, but such light will be admitted when a transparent band is between the source and the phototube. The resultant of the periodic blocking action, due to rotation of cylinder 12, is the production of a pulsating light flux and the generation of an alternating current component by the phototube. As previously indicated, this alternating current signal is selectively amplified. The phototube response being linear, the alternating current signal is substantially independent of the background illumination. Therefore, the light detector provided in accordance with this invention is particularly sensitive to the presence of a point source of light, such as an automobile head lamp, and selectively discriminates against spurious light sources. These are discriminated against because at long range they are not completely blocked out by opaque bands, and at short range the light intensity of the approaching head lamp assures control by it.

The size of a head lamp image for long ranges is such that its light is substantially completely obscured by opaque bands and completely passed by transparent bands.

In a practical working model of the invention we used a standard vacuum phototube such as the No. 918. A phototube with an S-1 surface was successfully used in detecting the presence and measuring the bearing of an oncoming source of infra red radiation.

As illustrated in Fig. 1, we position the optical system and the phototube in such a manner as preferably to "chop" a field from zero to 15.5 degrees bearing to the left, from zero to 5.5 degrees bearing to the right, from zero to 2 degrees inclination and from zero to 2 degrees declination.

Figures 2, 3:
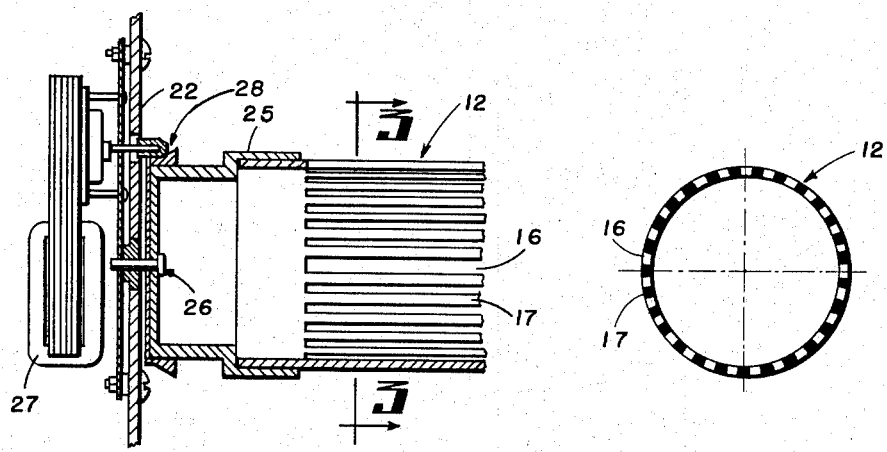
Fig. 2 is an axial cross-sectional view of the discriminator-cylinder of the light-source detector provided in accordance with the invention, together with its drive and shafting.
Fig. 3 is a cross-sectional view taken along the section line 3—3 of Fig. 2 and looking in the direction of the arrows.
Figure 4:
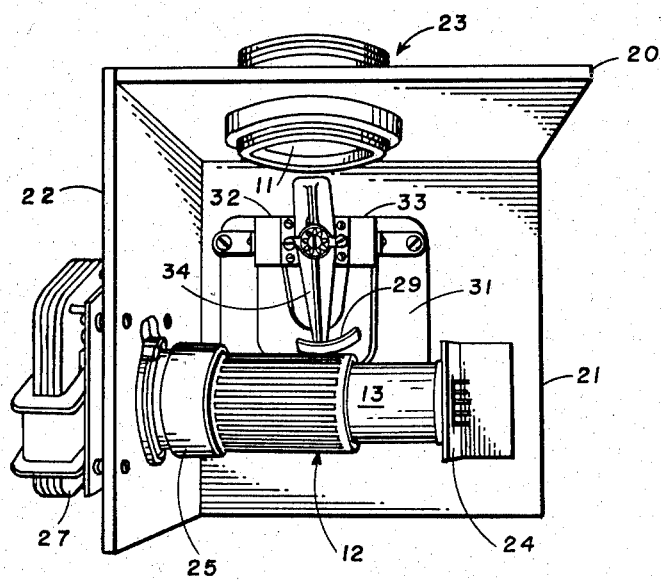
Fig. 4 is a perspective view, generally in top plan, of an illustrative embodiment of a complete direction finder in accordance with the invention.
Figure 5:
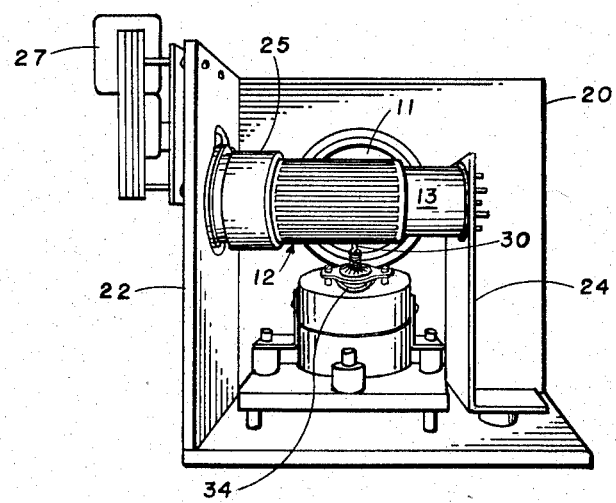
Fig. 5 is a perspective view of the direction finder, as taken from the rear.

Reference is made to Figs. 2, 4 and 5 in describing the construction of a preferred embodiment of the invention, implementing the principles and serving the objects hereinabove described. Support is provided by a rectangular metallic structure comprising a front panel 20, a base panel 21, and a side panel 22. The front is suitably apertured and provided with fittings to secure in place the optical system designated generally by the reference numeral 23, inclusive of lens 11. The phototube 13 is horizontally positioned and mounted on a suitable socket provided on a vertical supporting bracket 24.

The cylinder 12 is concentrically mounted for axial rotation relative to phototube 13 and is press-fitted to a drum 25, the latter being suitably journaled for rotation by conventional means 26. The cylinder is driven from a constant speed motor 27 by a friction drive generally indicated at 28.

As indicated in the aforementioned Bone patent application, the function of the phototube 13 is to produce an electrical signal controlling the system which positions the direction finder vane in azimuth. This vane is indicated in Fig. 4 by the reference numeral 29 and it is secured as by arm 30 to a suitable meter movement for angularly positioning it. Such a meter movement is shown in the Bone patent application and further reference to same is made for a detailed description. Briefly, however, the galvanometer movement comprises the usual permanent horse shoe magnet 31, pole pieces 32 and 33, and a galvanometer coil (not shown), the coil being rotatable in unison with a member 34, the angular position of which is a function of the current in the coil. In turn, the member 34, acting through arm 30, positions vane 29 in azimuth, such position being a measure of the relative bearing of the head lamp of the approaching automobile when the system is in use.

As the head lamp approaches, member 34, once the presence of the lamp is detected, turns counterclockwise so that the vane continuously measures relative bearing, the vane always being driven by the phototube-generated signals (caused by the presence of the desired light source) in such a direction as to tend to cut off the light source which causes the movement.

Figure 8:
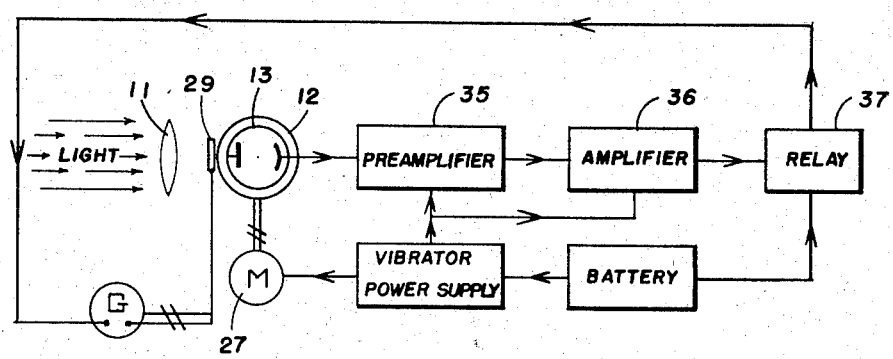
Fig. 8 is a block diagram of a control system suitable for use in an automobile headlighting system utilizing the improved direction finder provided herein.

Reference is now made to the block diagram in Fig. 8, which illustrates the main control units of a direction finder incorporating the improvements in accordance with the invention. As previously described, the lens forms an image of the field at the finder vane locus of movement. When a head lamp first appears in the field (assuming a straight road and previous darkness), the finder vane 29 is moved to the left (Fig. 4) and the light falls onto the continuously rotating cylinder tube. The dark bands 17 pass the image at a rate of 750 per second, producing a chopped light signal of this frequency. This light impinges on the phototube and produces an alternating current output signal component which is selectively amplified in a pre-amplifier 35 and an amplifier 36 to operate a relay 37 which in turn controls the meter movement (Fig. 4). When a point light source is present amplified signals from the phototube cause the relay to close so that the galvanometer moves the direction finder vane 29 toward the light image. When the edge of the vane reaches the light image, the light to the phototube is cut off, causing the relay 37 to be opened and the galvanometer to drive the vane 29 toward its original position. As soon as the vane starts to move away light again reaches the phototube and the relay 37 closes again, causing the galvanometer again to drive the vane edge toward the light image. Thus the vane edge oscillates very slightly about the image of the approaching headlight. As the oncoming car approaches the image of its head lamp moves as a result of the continuous change in relative bearing. The mean angular position assumed by the vane changes accordingly. The vane is associated with suitable means (not herein shown) for transmitting its angular position to the corresponding vanes in the head lamp system.

Figure 9:
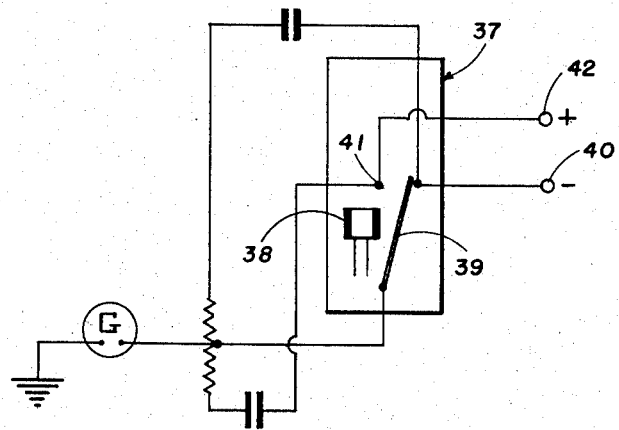
Fig. 9 is a circuit schematic of a suitable relay device for such control system.

The galvanometer movement can be driven in either direction by a suitable relay 37 such as that illustrated in Fig. 9, comprising a coil 38 which actuates armature 39, normally in circuit with negative supply terminal 40, to close with contact 41 in circuit with positive supply terminal 42. Thus it will be seen that when coil 38 is energized by amplifier 36, the direction of the galvanometer movement is such as to position the vane to measure relative bearing of the approaching car. On the other hand, in the absence of a signal from a desired light source, the galvanometer movement runs in the reverse direction.

While there has been shown and described what is at present considered to be the preferred embodiment of the present invention, various modifications and changes will occur to those skilled in the art, and it is intended in the appended claims to secure the invention with a proper range of equivalents. For example, the point light source detector per se, although of particular utility in a head lamp system, has other useful applications. Further various components of the light detector and direction finder may be substituted for the illustrative components herein shown.

Having thus described our invention, we claim:

1. In a direction finding system for detecting the presence and relative bearing of the illuminated head lamp of an approaching vehicle, said direction finding system being of the type which includes an optical system for producing an image of a field of vision in which such headlamp appears and light responsive means consisting of a horizontally-mounted phototube formed with a light-admitting aperture, the improvement which comprises, in combination, a light-translating cylinder concentrically mounted for axial rotation relative to said phototube and formed with a plurality of alternate light-admitting and light-intercepting horizontal strips, means for driving the cylinder, said cylinder being positioned to interpose several light-admitting strips between said optical system and said phototube, so that the light-admitting strips continuously admit light emanating generally from a substantial portion of said image but so that the light-intercepting strips periodically block out the image of a head lamp entering such field, whereby the phototube generates pulse signals indicative of the presence of such head lamp in said field, an azimuth-indicating vane interposed between said optical system and said cylinder and formed with an edge which moves generally axially relative to said cylinder as the vane turns to various positions, and means controlled by said pulse signals for positioning said vane.

2. In a direction-finder system for a vehicle headlighting system of the type including a light-sensitive generator of electrical signals; and optical means for producing an image of a field of vision in which an oncoming headlamp appears, the improvement comprising, in combination, discriminator means disposed between said optical means and said generator and proportioned continuously to admit light emanating generally from a substantial portion of said image to said generator and periodically to intercept light emanating specifically from a predetermined light area, said generator producing signal components indicative of the presence of said light area in said field, and means responsive to said components for measuring the relative bearing of said light area, the last mentioned means including an azimuth-indicating direction-finder vane which is positioned to intercept light passed by the discriminator means and circuit means controlled by said components for positioning said vane.

3. In a vehicle headlighting system, the combination of a single light-sensitive device, means including alternately arranged light-admitting and light-intercepting portions for continuously and without interruption admitting light emanating generally from a substantial portion of a field to said device while periodically intercepting light emanating specifically from a point source of light in said field whereby light from a source so dimensioned as to be blocked out by the light-interrupting portions produces an electrical effect indicative of such interception and the presence of said point source of light, and an optical system for defining said field, said means being disposed between the optical system and the light sensitive device.

4. In a direction finder for detecting the presence and relative bearing of the illuminated head lamp of an approaching vehicle, of the type which includes an optical system for producing an image of a field of vision and light responsive means consisting of a phototube formed with a light-admitting aperture; the improvement which comprises, in combination, a light-chopper mounted between said optical system and tube and formed with a plurality of alternate light-admitting and light-rejecting portions, means for driving the chopper, said chopper being positioned to rotate while interposing several light-admitting portions between said optical system and said phototube, whereby the phototube generates pulse signals indicative of the presence of such head lamp in said field, an azimuth-indicating vane interposed between said optical system and said chopper, and means responsive to said pulse signals for positioning said vane.

References Cited in the file of this patent

UNITED STATES PATENTS

| | | |
|---|---|---|
| 2,562,258 | Bone | July 31, 1951 |
| 2,707,524 | Montgomery | May 3, 1955 |
| 2,730,654 | Rabinow | Jan. 10, 1956 |
| 2,753,487 | Bone | July 3, 1956 |
| 2,795,736 | Dilks | June 11, 1957 |